US011768536B2

United States Patent
David

(10) Patent No.: US 11,768,536 B2
(45) Date of Patent: Sep. 26, 2023

(54) SYSTEMS AND METHODS FOR USER INTERACTION BASED VEHICLE FEATURE CONTROL

(71) Applicant: TOYOTA MOTOR ENGINEERING & MANUFACTURING NORTH AMERICA, INC., Plano, TX (US)

(72) Inventor: Mikio David, Ypsilanti, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 17/470,532

(22) Filed: Sep. 9, 2021

(65) Prior Publication Data

US 2023/0075321 A1 Mar. 9, 2023

(51) Int. Cl.

| | |
|---|---|
| ***G06F 3/01*** | (2006.01) |
| ***G06F 3/041*** | (2006.01) |
| ***G05B 13/02*** | (2006.01) |
| ***B60K 35/00*** | (2006.01) |
| ***G06F 3/0482*** | (2013.01) |

(52) U.S. Cl.

CPC .............. *G06F 3/013* (2013.01); *B60K 35/00* (2013.01); *G05B 13/027* (2013.01); *G06F 3/012* (2013.01); *G06F 3/041* (2013.01); *B60K 2370/143* (2019.05); *B60K 2370/149* (2019.05); *B60K 2370/21* (2019.05); *G06F 3/0482* (2013.01)

(58) Field of Classification Search

None

See application file for complete search history.

(56) References Cited

U.S. PATENT DOCUMENTS

| | | | |
|---|---|---|---|
| 9,891,782 | B2 | 2/2018 | Gregory et al. |
| 10,120,992 | B2 | 11/2018 | Shim et al. |
| 10,417,974 | B2 | 9/2019 | Yoo et al. |

(Continued)

FOREIGN PATENT DOCUMENTS

| | | | |
|---|---|---|---|
| DE | 102017215161 | A1 | 2/2019 |
| KR | 101825450 | B1 | 2/2018 |
| WO | 2016124473 | A1 | 8/2016 |

OTHER PUBLICATIONS

Gowdham Prabhakar et al.; "Interactive Gaze and Finger Controlled Hud for Cars" https://www.researchgate.net/publication/337473894_Interactive_gaze_and_finger_controlled_HUd_for_cars; Nov. 2019; 17pgs.

*Primary Examiner* — Christopher R Lamb
(74) *Attorney, Agent, or Firm* — Dinsmore & Shohl LLP

(57) ABSTRACT

A method for controlling vehicle operations based on user orientation and user interaction data is provided. The method includes detecting, using a sensor operating in conjunction with the computing device of the vehicle, an orientation of a part of a user relative to a location on a display that is positioned in an interior of the vehicle, detecting, using an additional sensor, an interaction between the user and a portion of the display positioned in the interior of the vehicle, determining, using the computing device, whether a distance between the location and the portion of the display satisfies a threshold, and controlling, by the computing device, an operation associated with the vehicle responsive to determining that the distance between the location and the portion of the display satisfies the threshold.

19 Claims, 12 Drawing Sheets

(56) References Cited

U.S. PATENT DOCUMENTS

| | | | | |
|---|---|---|---|---|
| 2013/0145304 | A1* | 6/2013 | DeLuca | G06F 3/013 715/781 |
| 2013/0234929 | A1* | 9/2013 | Libin | G06F 3/01 345/156 |
| 2014/0118268 | A1* | 5/2014 | Kusch | G06F 3/04842 345/173 |
| 2014/0160048 | A1* | 6/2014 | Conway | G06F 3/041 345/173 |
| 2016/0104486 | A1* | 4/2016 | Penilla | G10L 15/02 704/232 |
| 2017/0011557 | A1 | 1/2017 | Lee et al. | |
| 2020/0401218 | A1* | 12/2020 | Camilleri | G06F 3/013 |
| 2021/0089131 | A1 | 3/2021 | Wang et al. | |

* cited by examiner

SYSTEMS AND METHODS FOR USER INTERACTION BASED VEHICLE FEATURE CONTROL

TECHNICAL FIELD

The embodiments described herein generally relate to controlling vehicle operation based on user interaction data, and more particularly, to controlling one or more features of a vehicle based on analyzing multiple forms of user interaction data within a time period.

BACKGROUND

Vehicles utilize various sensors to detect actions performed by drivers and passengers such as gestures, contacts with various surfaces, and so forth. For example, vehicles include touchscreen based head units with which drivers and passengers may interact in order to control various vehicle features. However, relying purely on one type of action or interaction, e.g., a contact with a touch screen, to control one or more vehicle features may result in an inaccurate operation of a vehicle feature or an operation of a vehicle feature that was not intended by a driver or passenger, e.g., inaccurately increasing a temperature of a vehicle, selecting a song from a playlist incorrectly, and so forth.

Accordingly, a need exists for alternative user interaction based vehicle feature control systems that obtain and analyze different types of user actions to determine a particular vehicle feature that a user intended to control.

SUMMARY

In one embodiment, a method for controlling vehicle operations based on user orientation and user interaction data is provided. The method includes detecting, using a sensor operating in conjunction with the computing device of the vehicle, an orientation of a part of a user relative to a location on a display that is positioned in an interior of the vehicle, detecting, using an additional sensor, an interaction between the user and a portion of the display positioned in the interior of the vehicle, determining, using the computing device, whether a distance between the location and the portion of the display satisfies a threshold, and controlling, by the computing device, an operation associated with the vehicle responsive to determining that the distance between the location and the portion of the display satisfies the threshold.

In another embodiment, a vehicle for controlling vehicle operations based on user orientation and user interaction data is provided. The vehicle includes a sensor, an additional sensor, a display and a computing device that is communicatively coupled to the sensor, the additional sensor, and the display. The computing device is configured to detect, using the sensor operating in conjunction with the computing device of the vehicle, an orientation of a part of a user relative to a location on the display that is positioned in an interior of the vehicle, detect, using the additional sensor, an interaction between the user and a portion of the display positioned in the interior of the vehicle, determine, using the computing device, whether a distance between the location and the portion of the display satisfies a threshold, and control, by the computing device, an operation associated with the vehicle responsive to determining that the distance between the location and the portion of the display satisfies the threshold.

In yet another embodiment, a system for controlling vehicle operations based on user orientation and user interaction data is provided. The system includes a camera, a touch sensor, a display, one or more processors, one or more memory components communicatively coupled to the one or more processors, and machine readable instructions stored in the one or more memory components. The machine readable instructions stored in the one or more memory components cause the system to perform at least the following when executed by the one or more processors that cause the system to perform at least the following when executed by the one or more processors: detect, using the camera, a gaze of a user relative to a location on the display positioned in an interior of a vehicle, detect, using the touch sensor, an interaction between the user and a portion of the display positioned in the interior of the vehicle, determine whether a distance between the location of the gaze and the portion of the display satisfies a threshold, and control an operation associated with the vehicle responsive to determining that the distance between the location of the gaze and the portion of the display satisfies the threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicle systems may include various devices, e.g., head units, with which passengers and drivers may interact. As stated, passengers and drivers may contact various portions of the head units to control vehicle features, e.g., climate controls, heated seats, navigation, audio control, and so forth. These vehicle systems typically rely on only one user interaction, e.g., a gesture or contact with the surface of the head unit, to control the vehicle features. As such, these systems do not account for and correct inadvertent interactions from drivers and passengers. For example, even if a user inadvertently selects a icon corresponding to climate controls or activation of heated seats, the vehicle systems may nonetheless initiate operation of the climate controls or the heated seats. As such, these vehicle systems do not have a mechanism to discern and correct for unintentional interactions or gestures.

The embodiments disclosed herein address and overcome the deficiencies of the above described vehicle systems. The embodiments of the present disclosure are directed to systems and methods for controlling one or more operations based on analyzing multiple user interactions. In particular, one or more vehicle operations may be controlled responsive to determining that a distance between a location of a display at which an orientation of a part of a user is directed and a portion of the display that the user contacted, satisfies a threshold value. If the threshold value is satisfied, a vehicle operation may be performed and if the threshold value is not satisfied, the system may not perform an operation. In this way, control of vehicle operations is based on analysis of multiple user interactions. In some embodiments, the system described herein may also utilize an artificial intelligence neural network trained model to analyze interaction data specific to a user and interaction data specific to a plurality of other users in order to determine a target action to be performed by the user. Additionally, the system may, automatically and without user intervention, control execution of a vehicle operation corresponding to the target action. It is also noted that the systems and methods described herein may operate and enable control of one or more vehicle operations independent of the artificial intelligence neural network trained model.

Figure 1:
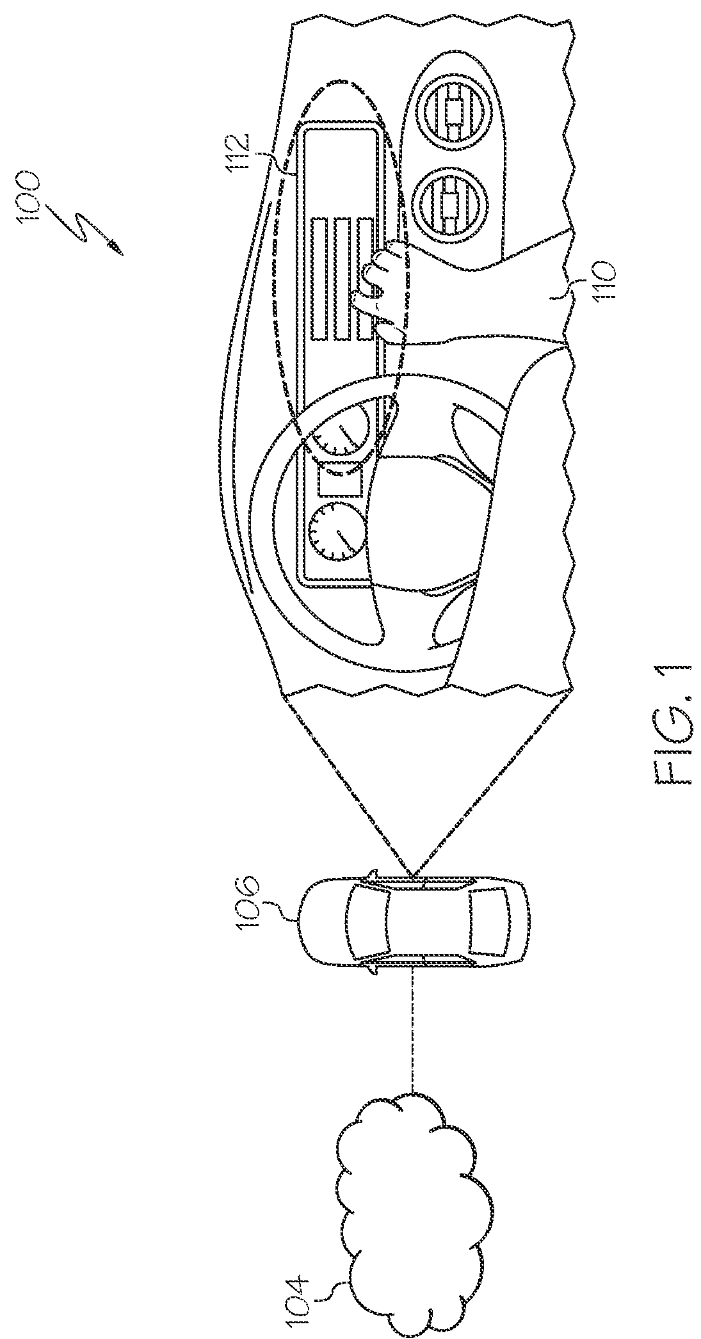
FIG. 1 schematically depicts a computing environment for performing an example operation of the vehicle feature control system of the present disclosure, according to one or more embodiments described and illustrated herein.

FIG. 1 schematically depicts a computing environment 100 that performs an example operation of the vehicle feature control system of the present disclosure, according to one or more embodiments described and illustrated herein. The computing environment 100 as described in the present disclosure may include a vehicle 106 that is communicatively coupled to a communication network 104. In embodiments, a user 110 may be a driver or passenger seated inside the vehicle 106.

Vehicles utilize various sensors to detect actions performed by drivers and passengers such as gestures, contacts with various surfaces, and so forth. For example, vehicles include touchscreen based head units with which drivers and passengers may interact in order to control various vehicle features. However, relying purely on one type of action or interaction, e.g., a contact with a touch screen, to control one or more vehicle features may result in an inaccurate operation of a vehicle feature or an operation of a vehicle feature that was not intended by a driver or passenger, e.g., inaccurately increasing a temperature of a vehicle, inadvertently selecting a song from a playlist, and so forth.

In embodiments, the system may include a plurality of sensors, e.g., touch sensors, proximity sensors, IR sensors, compression sensors, and cameras. These sensors may be positioned at various locations in the vehicle 106. For example, the cameras, proximity sensors, and IR sensors may be positioned on or within a to the vehicle's steering wheel, a head unit 112, the dashboard, or next to various vehicle air vents. The touch sensors may be embedded on the steering wheel, the head unit 112, the dashboard, and adjacent to the vehicle's gearbox, e.g., within 100-200 centimeters of the vehicle's gearbox. Other locations for positioning these sensors are also contemplated.

In an example operation, the user 110 may control, in real time, one or more operations of the vehicle 106 using a combination of one or more actions. For example, the user 110 may be able to activate, deactivate, and modify climate controls in the interior of the vehicle 106 by performing a combination of various actions. In embodiments, the user 110 may direct his or her gaze towards a particular set of controls and select one or more of the particular set of controls. In embodiments, the user 110 may direct his or her gaze towards a climate control input device (e.g., a physical switch, a digital switch included as part of the head unit 112 or the dashboard, and so forth). One or more cameras positioned in the vehicle 106 may capture an image or a live video stream of the user 110 directing his gaze towards the control input switch. Additionally, the user 110 may select the same control input device with his finger. The system may utilize a touch sensor or a proximity sensor to detect the position data associated with the position on the control input device contacted by the finger of the user 110.

The system may perform, using an artificial intelligence neural network trained model or independent of the artificial intelligence neural network trained model, an analysis of the position data in addition to image data associated with the image or the live video stream to a threshold value associated with the position data and the image data. For example, the system may determine a distance value between the location at which the gaze of the user 110 was directed and the position or area within the vehicle 106 that the user 110 contacted. If the distance value was less than a threshold value, the system may determine that the user 110 intended to interact with the input device. By contrast, if the distance value satisfies the threshold value, the system may prevent control of a particular vehicle operation. Additionally, in embodiments, if the distance value satisfies the threshold value, the system may perform an analysis and classify data received from a specific sensor as more reliable than data received from another sensor, and as such, may enable controlling one or more operations of the vehicle 106 based on the more reliable data.

Figure 2:
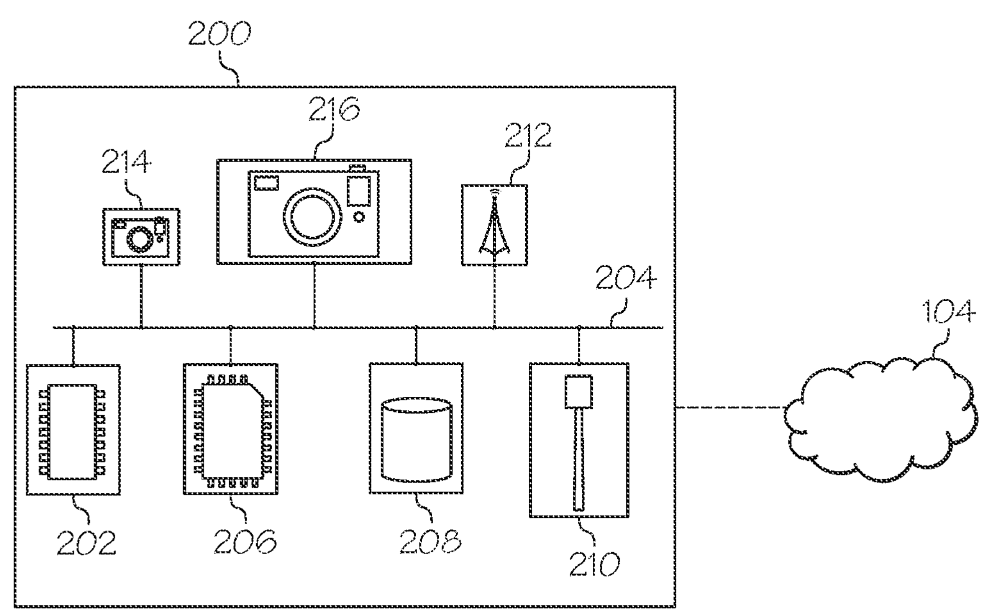
FIG. 2 depicts non-limiting components of the devices of the present disclosure, according to one or more embodiments described and illustrated herein.

FIG. 2 depicts non-limiting components of the devices of the present disclosure, according to one or more embodiments described and illustrated herein. While the vehicle system 200 is depicted in isolation in FIG. 2, the vehicle system 200 may be included within a vehicle. For example, the vehicle system 200 may be included within the vehicle 106 illustrated in FIG. 1. In embodiments in which the vehicle system 200 is included within the vehicle 106, such a vehicle may be an automobile or any other passenger or non-passenger vehicle such as, for example, a terrestrial, aquatic, and/or airborne vehicle. In embodiments in which the vehicle system 200 is included within the vehicle 106, such a vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

In embodiments, the vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

In the vehicle system 200, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like. Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206.

Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206 may store data related to user actions performed with respect to various components and devices within the vehicle. For example, the memory modules 206 may store position data associated with one or more locations within the vehicle 106 that the user 110 may have contacted. The memory modules 206 may also store user action data associated with a plurality of additional users that may have performed actions with other vehicles, e.g., vehicles that are external to the vehicle 106.

Referring still to FIG. 2, the vehicle system 200 may include one or more sensors 208. Each of the one or more sensors 208 is coupled to the communication path 204 and communicatively coupled to the one or more processors 202. The one or more sensors 208 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. In embodiments, the sensors 208 may also include motion sensors and/or proximity sensors that are configured to detect road agents and movements of road agents (e.g., pedestrians, other vehicles, etc.) within a certain distance from these sensors. It is noted that data from the accelerometers may be analyzed the one or more processors 202 in conjunction with the obtained from the other sensors to enable control of one or more operations of the vehicle 106.

Referring to FIG. 2, the vehicle system 200 may include a satellite antenna 210 coupled to the communication path 204 such that the communication path 204 communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the one or more processors 202.

Still referring to FIG. 2, the vehicle system 200 comprises network interface hardware 212 (e.g., a data communication module) for communicatively coupling the vehicle system 200 to various external devices, e.g., remote servers, cloud servers, etc. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, the network interface hardware 212 (e.g., a data communication module) may receive data related to user actions performed by various users associated with vehicles that are external to the vehicle 106. In embodiments, the network interface hardware 212 may utilize or be compatible with a communication protocol that is based on dedicated short range communications (DSRC). In other embodiments, the network interface hardware 212 may utilize or be compatible with a communication protocol that is based on vehicle-to-everything (V2X). Compatibility with other communication protocols is also contemplated.

Still referring to FIG. 2, the vehicle system 200 may include an outward facing camera 214. The outward facing camera 214 may be installed on a front portion of the vehicle 106 such that this camera may capture one or more images or a live video stream of stationary and moving objects (e.g., road agents such as pedestrians, other vehicles, etc.) within a certain proximity of the vehicle 106. The outward facing camera 214 may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments, the outward facing camera 214 may have a broad angle feature that enables capturing digital content within a 150 degree to 180 degree arc range. Alternatively, the outward facing camera 214 may have a narrow angle feature that enables capturing digital content within a narrow arc range, e.g., 60 degree to 90 degree arc range. In embodiments, the outward facing camera 214 may be capable of capturing standard or high definition images in a 720 pixel resolution, a 1080 pixel resolution, and so forth. Alternatively or additionally, the outward facing camera 214 may have the functionality to capture a continuous real time video stream for a predetermined time period.

Still referring to FIG. 2, the vehicle system 200 includes an inward facing camera 216 (e.g., an additional camera). The inward facing camera 216 maybe installed within an interior of the vehicle 106 such that this camera may capture one or more images or a live video stream of the drivers and passengers within the vehicle 106. In embodiments, the one or more images or a live video stream that is captured by the inward facing camera 216 may be analyzed by the one or more processors 202 to determine the orientation of the heads, eyes, etc., of the drivers and passengers in relation to one or more objects in the interior of the vehicle 106. As stated, the inward facing camera 216 may be positioned on the steering wheel, dashboard, head unit 112, or other locations that have a clear line of sight of the driver and/or the passenger seated in the front seat. The inward facing camera 216 may have a resolution level to accurately detect the direction of the gaze of the user relative to various components within the vehicle 106.

The inward facing camera 216 may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments, the inward facing camera 216 may have a broad angle feature that enables capturing digital content within a 150 degree to 180 degree arc range. Alternatively, the inward facing camera 216 may have a narrow angle feature that enables capturing digital content within a narrow arc range, e.g., 60 degree to 90 degree arc range. In embodiments, the inward facing camera 216 may be capable of capturing standard or high definition images in a 720 pixel resolution, a 1080 pixel resolution, and so forth. Alternatively or additionally, the inward facing camera 216 may have the functionality to capture a continuous real time video stream for a predetermined time period.

Figure 3A:
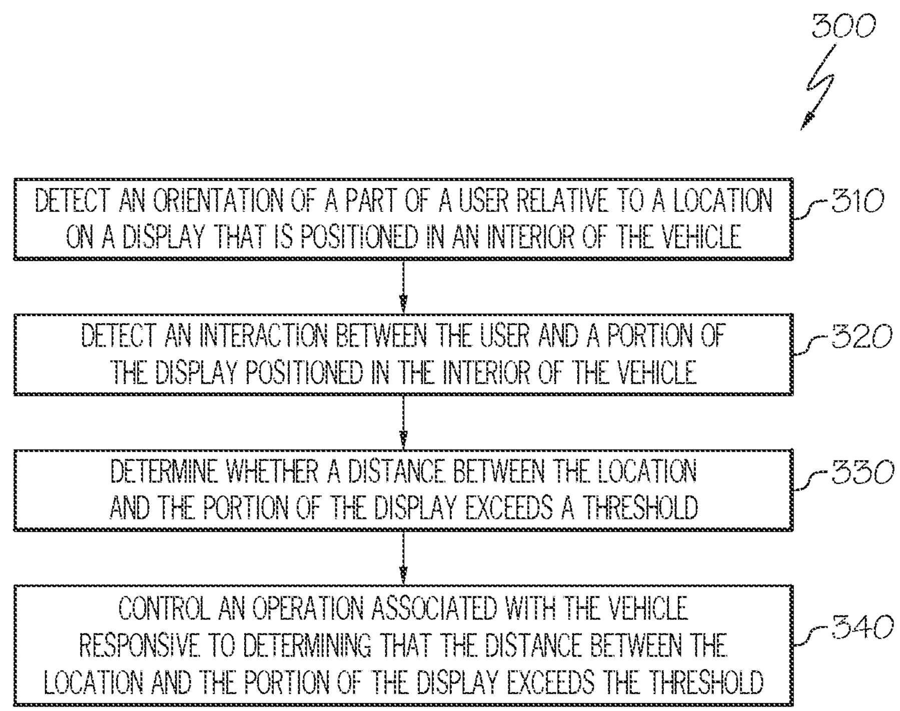
FIG. 3A depicts a flow chart for controlling one or more operations within the vehicle, according to one or more embodiments described and illustrated herein.

FIG. 3A depicts a flow chart 300 for controlling one or more operations within the vehicle 106, according to one or more embodiments described and illustrated herein. In embodiments, at block 310, one or more sensors as described in the present disclosure may detect an orientation of a part of the user 110 relative to a location on a display of the head unit 112 that is positioned in an interior of the vehicle 106. Specifically, the one or more sensors may include an inward facing camera 216 positioned adjacent to the head unit 112, another camera positioned at a location that is within a direct line of sight of the user 110, and so forth. These cameras may capture image data (e.g., one or more images) or a live video stream of an orientation of the head of the user 110 relative to the head unit 112. Additionally, the one or more processors 202 may analyze the image data and determine the orientation of the eyes of the user 110, namely with respect to various locations within the vehicle 106 at which the user 110 may be gazing, e.g., within a certain time frame.

At block 320, another sensor (e.g., an additional sensor) as described in the present disclosure may detect an interaction between the user 110 and a portion of the display of the head unit 112, e.g., the display on which interactive graphical representations may be output. In embodiments, the additional sensor as described in the present disclosure may be a touch sensor that detects portions of the display of the head unit 112 that the user 110 may contact. The additional sensor may also be a proximity sensor that detects the presence of, e.g., a hand or finger of the user 110, when the user 110 is within a certain distance of the head unit 112. The additional sensor and the inward facing camera 216 may also obtain data regarding an arm's length of the user 110 relative to the head unit 112.

At block 330, the one or more sensors 208 may determine whether a distance between the location at which the user 110 may have gazed and/or oriented his head and the portion of the display that the user 110 may have contacted satisfies a threshold. In embodiments, the threshold may correspond to a threshold distance value and the threshold may be satisfied if the distance between the location at which the user 110 may have gazed and/or oriented his head and the portion of the display that the user 110 may have contacted is less than the threshold distance value.

At block 340, the one or more processors of a computing device (e.g., an ECU) installed as part of the vehicle 106 may control an operation associated with the vehicle responsive to determining that the distance between the location at which the user 110 may have gazed and/or oriented his head and the portion of the display that the user 110 may have contacted satisfies the threshold.

Figure 3B:
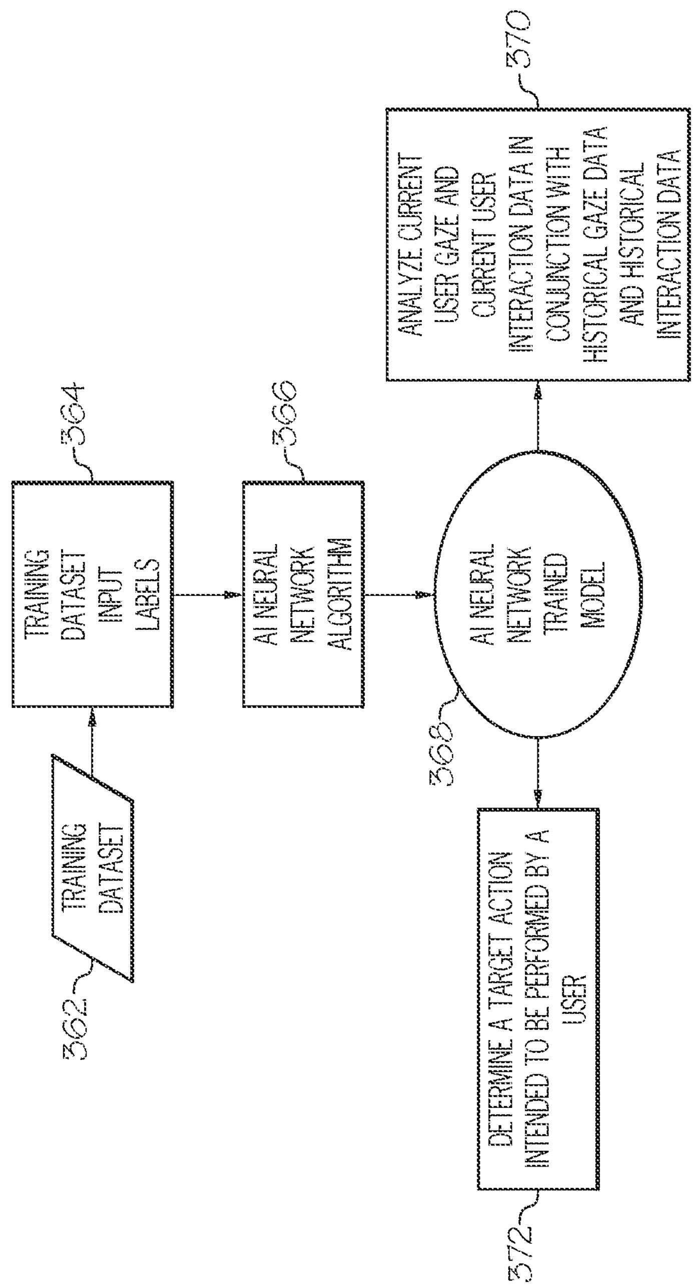
FIG. 3B depicts a flowchart for training an artificial intelligence neural network model to identify a target action intended to be performed by the user, according to one or more embodiments described and illustrated herein.

FIG. 3B depicts a flowchart for training an artificial intelligence neural network model to identify a target action intended to be performed by the user 110, according to one or more embodiments described and illustrated herein. As illustrated in block 362, a training dataset may include training data in the form of user interaction data associated with various time periods and in association with various vehicles. The user interaction data may include historical position data, historical image data that includes historical gaze data and historical head orientation data, and so forth. Additionally, other types of data may include, e.g., data obtained by accelerometer, proximity sensors, weight sensors, and so forth. The interaction data and other types of data may be stored as part of a third party cloud server that is external to the vehicle 106, as illustrated in FIG. 1. In embodiments, the user interaction data may be updated in real time to include data associated with new interactions associated with various users. It is noted that, in some embodiments, the system described herein may control vehicle operations based on user orientation and user interaction data and independent of the artificial intelligence neural network trained model as illustrated in FIG. 3B and described below.

In block 364 and block 366, an artificial intelligence neural network algorithm may be utilized to train a model on the training dataset with the input labels. As stated, all or parts of the training dataset may be raw data in the form of images, text, files, videos, and so forth, that may be processed and organized. Such processing and organization may include adding dataset input labels to the raw data so that an artificial intelligence neural network based model may be trained using the labeled training dataset.

One or more artificial neural networks (ANNs) used for training the artificial intelligence neural network based model and the artificial intelligence neural network algorithm may include connections between nodes that form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error.

In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling.

Additionally, one or more ANN models may be utilized to generate results as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In some embodiments, a convolutional neural network (CNN) may be utilized. For example, a CNN may be used as an ANN that, in a field of machine learning, for example, is a class of deep, feed-forward ANNs that may be applied for audio-visual analysis. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture. Upon adequately training the artificial intelligence neural network trained model, the embodiments may utilize this model to perform various actions.

Specifically, in blocks 370 and block 372, the one or more processors 202 may utilize the artificial neural network trained model to analyze current user interaction data in conjunction with historical user interaction data and determine a target action that a particular user (e.g., the user 110) intended to perform at a particular time. The one or more processors 202 may also utilize the artificial intelligence neural network trained model to perform a variety of other actions, e.g., determine that certain types of data that may be considered unreliable based on variety of factors and prevent the execution of an operation based on such data.

Figure 4A:
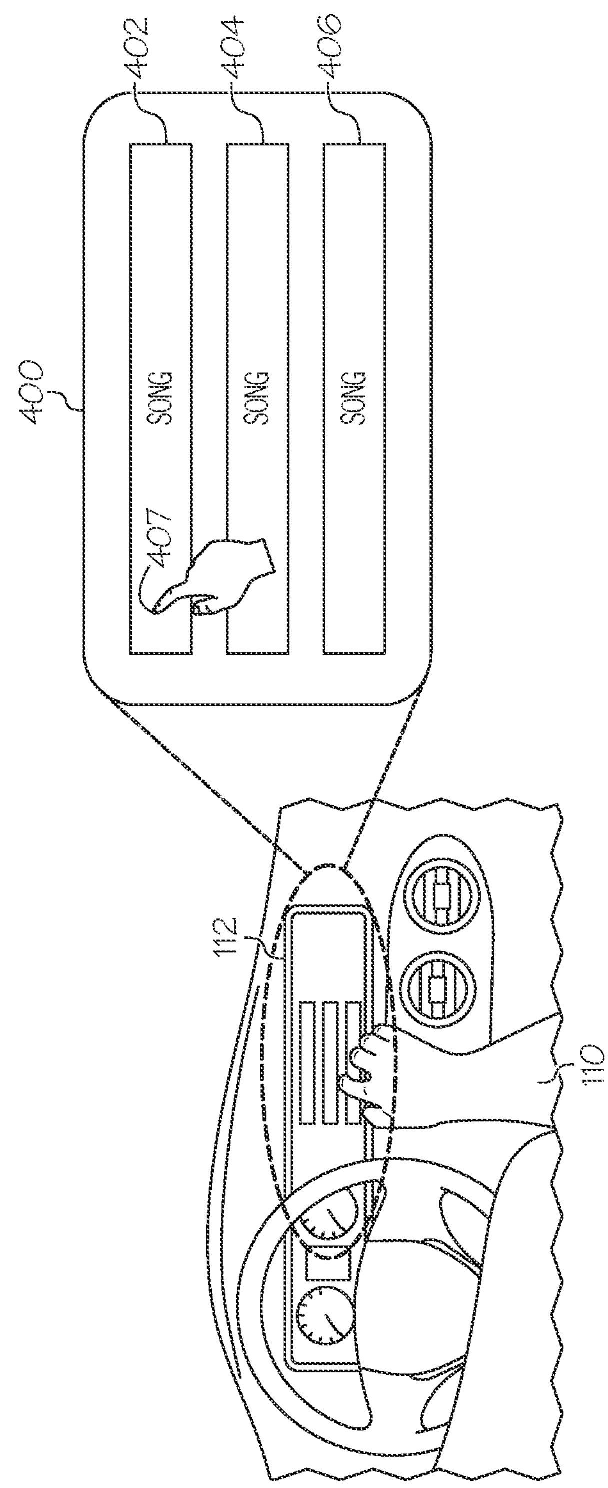
FIG. 4A depicts an interaction between the user with respect to the head unit, according to one or more embodiments described and illustrated herein.

FIG. 4A depicts an interaction between the user 110 and the head unit 112, according to one or more embodiments described and illustrated herein. In embodiments, the user 110 may activate the head unit 112 by speaking a voice command that may be recognized by the one or more processors 202. In other embodiments, the user 110 may contact a physical input device (e.g., button or switch) in order to activate (e.g., turn on) and deactivate (e.g., turn off) the head unit 112. In one example operation, a list of interactive graphical representations associated with various songs icons (e.g., song icons 402, 404, 406) may be output on a user interface 400 displayed on the head unit 112. The user may move his arm generally towards the direction of the head unit 112 in addition to bringing his index finger 407 within a certain distance of the graphical representation corresponding to the song icon 402 to select the interactive graphical representation associated with the song icon 402.

Figure 4B:
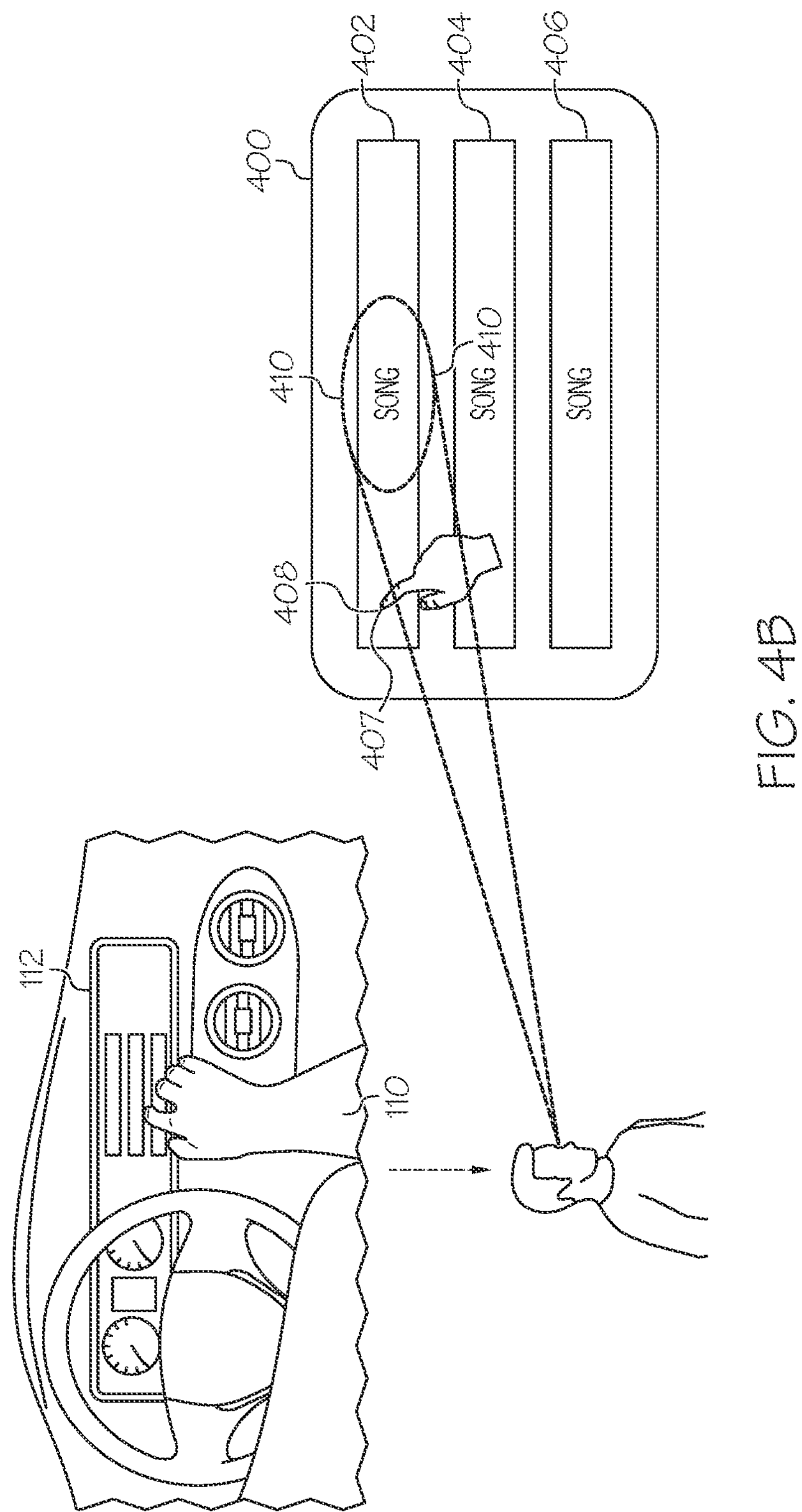
FIG. 4B depicts another action performed by the user with respect to the head unit, according to one or more embodiments described and illustrated herein.

FIG. 4B depicts another action performed by the user 110 with respect to the head unit 112, according to one or more embodiments described and illustrated herein. In embodiments, the user 110 may orient his head at a certain angle relative to the head unit 112 and direct his gaze towards the graphical representation corresponding to the song icon 402. Data relating to each of the user actions described above and illustrated in FIGS. 4A and 4B may be captured by a combination of one or more sensors of the vehicle 106 and the inward facing camera 216. For example, the inward facing camera 216 may capture multiple images or a live video stream (e.g., image data) of an orientation of the head of the user 110 relative to the head unit 112 and the index finger 407 approaching the interactive graphical representation of the song icon 402. The inward facing camera 216 may also capture multiple images or a live video stream of the direction and orientation of the eyes of the user 110.

Additionally, a touch sensor may detect the user 110 contacting the interactive graphical representation of the song icon 402 and obtain position data specific to the contact. The position data specific to the index finger 407 and the image data of an orientation of a head of the user 110 may both be analyzed, by the one or more processors 202, in real time. The analysis may be based on an artificial intelligence neural network trained model or independent of such a model. A proximity sensor may also be utilized to obtain proximity data between with the index finger 407 of the user 110 and interactive graphical representation of the song icon 402.

In embodiments, based on the analysis, the one or more processors 202 may determine a distance value between a particular location on the display of the head unit 112 towards which the user 110 may have oriented a part of his body and a portion of the display that the user may have contacted. In particular, the distance may be between the portion of the display of the head unit 112 that the user 110 contacted, namely the portion on which the interaction graphical representation of the song icon 402 is displayed, and the location at which the gaze of the user 110 is directed. As illustrated in FIG. 4B, the one or more processors 202 may analyze the image data obtained from the inward facing camera 216 and determine that the user is looking towards a center location 410 of the interaction graphical representation corresponding to the song icon 402 and has contacted the interaction graphical representation of the song icon 402 using the index finger 407. Based on these two actions, the one or more processors 202 may determine a distance between the center location 410 and the left portion 408 contacted by the index finger 407. Additionally, the one or more processors 202 may determine whether the determined distance satisfies a threshold, which may include determining whether the distance is less or equal to a particular threshold.

In embodiments, if the distances satisfies the threshold, the one or more processors 202 may, automatically and without user intervention, control an operation associated with the vehicle. In the operation illustrated in FIGS. 4A and 4B, if the determined distance between the left portion 408 and center location 410 is less than or equal to the threshold, the one or more processors may instruct an audio component of the vehicle 106 to output (e.g., play) a song associated with the song icon 402. In embodiments, the threshold distance may be based on the dimensions of the interaction graphical representation of the song icon 402 such that contacting any portion of the representation and gazing at or orienting the user's head towards any part of the representation may initiate the playing of the song icon 402 by the one or more processors 202. For example, the user 110 may gaze at a right-most portion of the representation of song icon 402 and contact a left-most portion of the representation, based on which the one or more processors 202 begin playing the song icon.

In embodiments, prior to instructing the audio component to output the song icon 402, as part of the analysis of the position data and the image data, the one or more processors 202 may perform a step of determining whether the user 110 oriented a part of his body (e.g., the head or the gaze of the user 110) for a predetermined time frame, e.g., 50 milliseconds, 1 second, and so forth. Additionally, the one or more processors 202 may perform a step of determining whether an amount of time between when the user 110 first oriented his head or his gaze towards the interactive graphical representation and when the user 110 first contacted the graphical representation of the song icon 402, is below a certain time threshold. If so, the one or more processors 202 may determine that the user 110 had the intention of selecting the interactive graphical representation corresponding to the song icon 402. By contrast, if the determined amount of time exceeds the time threshold, the one or more processors 202 may determine that the user did not have the intention of selecting the interactive graphical representation.

In short, the one or more processors 202 analyzes both the image data and the position data prior to controlling an operation associated with the vehicle. It is noted that while selection of a song icon and outputting a song associated with the song icon via an audio component (e.g., one or more speakers) is described, a variety of other operations associated with the vehicle 106 may also be controlled. For example, vehicle climate controls, the operation of heated seats within the vehicle, the operation of the rear view mirrors, display settings of the head unit 112, and so forth, may also be controlled. Other types of vehicle operations are also contemplated.

Figure 4C:
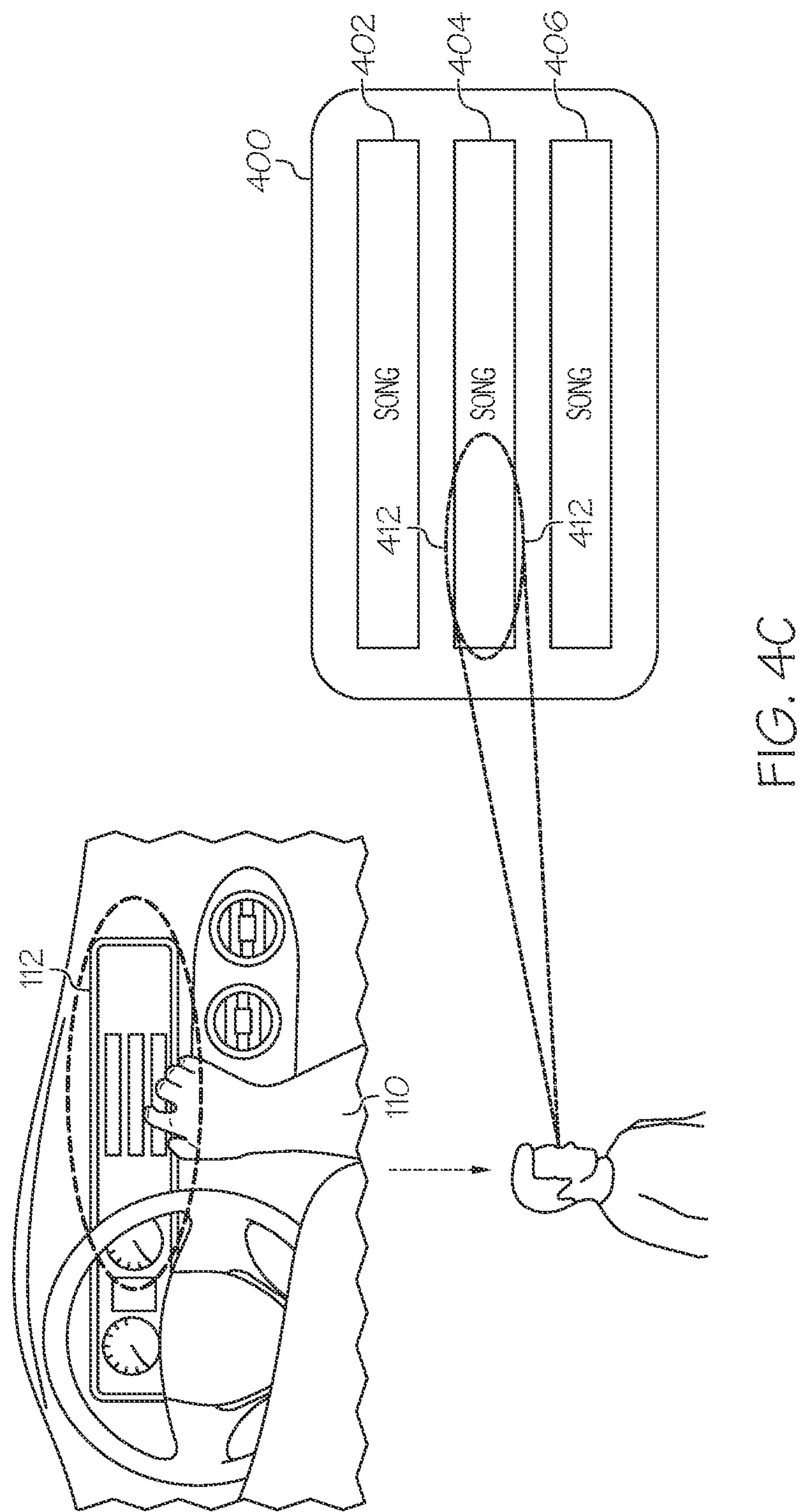
FIG. 4C depicts the user orienting his gaze towards an interactive graphical representation of a song icon that is output on the user interface displayed on the head unit, according to one or more embodiments described and illustrated herein.

FIG. 4C depicts the user 110 orienting his gaze (e.g., additional gaze and/or additional orientation) towards an interactive graphical representation of a song icon 404 that is output on the user interface 400 displayed on the head unit 112, according to one or more embodiments described and illustrated herein. As illustrated, the user 110 may sit in the driver seat of the vehicle 106 and orient his head towards the head unit 112. In response, as described above, the inward facing camera 216 may, automatically and without user intervention, obtain image data of the head of the user 110 in the form of multiple images or a live video stream and route this data via the communication path 204 to the one or more processors 202. The processors may analyze the data, extract information regarding the direction at which the eyes of the user 110 positioned, and identify various areas in the interior of the vehicle the user 110 may be viewing. The one or more processors 202 may determine that the user 110 has oriented his head towards the head unit 112 and is currently gazing or viewing a left location 412 of the interaction graphical representation of the song icon 404. The one or more processors 202 may also identify an amount of time that the user 110 may have been viewing the interactive graphical representation, e.g., 25 milliseconds, 50 milliseconds, 1 second, and so forth.

Figure 4D:
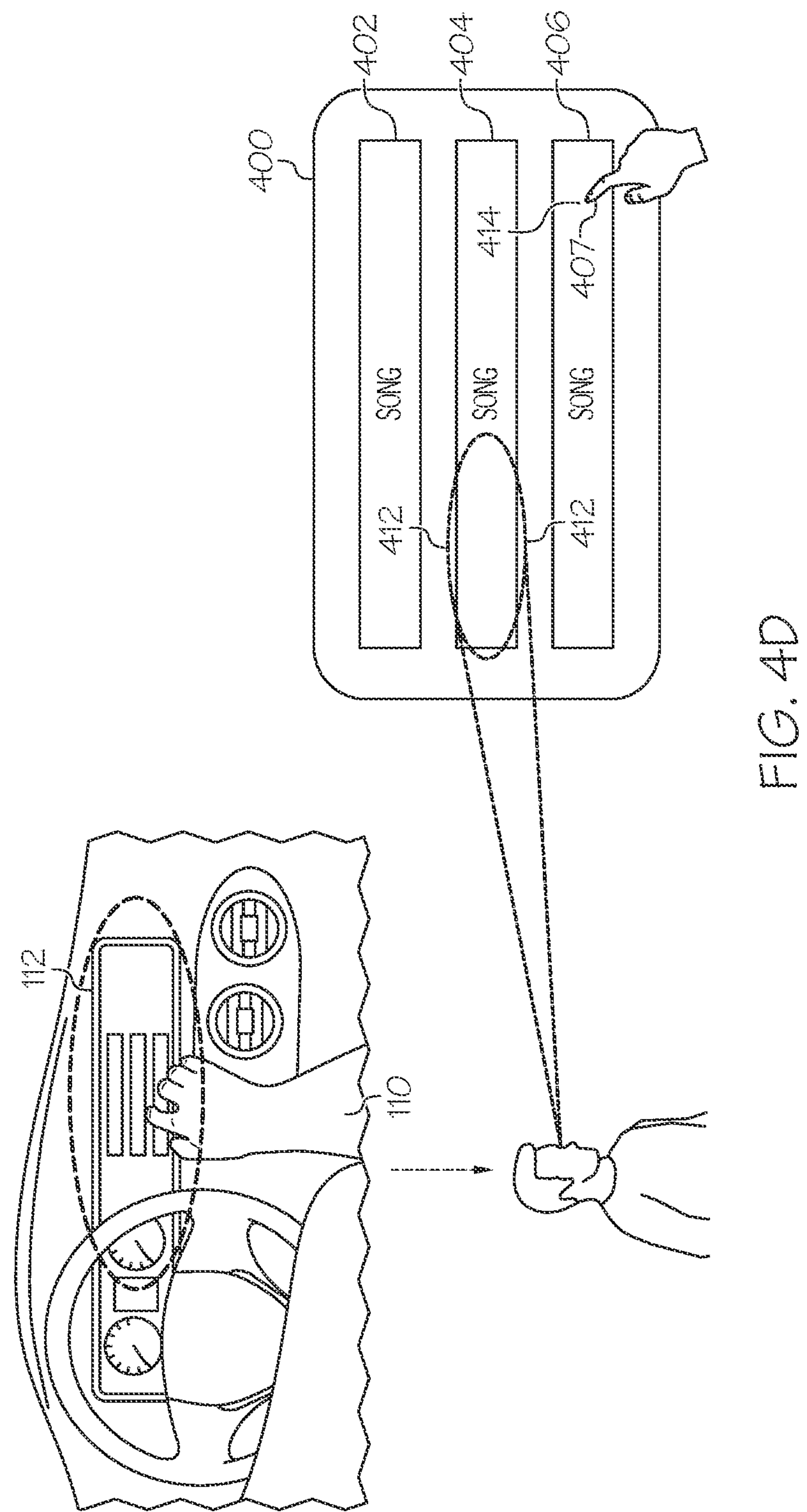
FIG. 4D depicts an interaction between the user and an interactive graphical representation of a song icon, according to one or more embodiments described and illustrated herein.

FIG. 4D depicts an interaction between the user 110 and an interactive graphical representation of a song icon 406, according to one or more embodiments described and illustrated herein. In embodiments, a touch sensor may detect position data of a contact (e.g., an additional interaction) between the index finger 407 and a right part 414 (e.g., an additional location or an additional portion) of the interactive graphical representation of the song icon 406, and route the position data to the one or more processors 202. The one or more processors may analyze the image data as described with respect to FIG. 4C and the position data, and determine that a distance (e.g., an additional distance) between the left location 412 and the right part 414 exceeds a threshold. Based on this analysis, the one or more processors 202 may determine that is it not clear whether the user 110 intended to the interactive graphical representation corresponding to song icon 404 or 406, as the position data and the image data provide contradictory indications. Specifically, in embodiments, the one or more processors 202 may determine that the user 110 oriented his head and gazed at the left location 412 for a predetermined amount of time (e.g., 50 milliseconds, 1 second, and so forth) and contacted the right part 414 of the interaction representation of song icon 406.

In embodiments, in such a scenario, the one or more processors 202 may prevent selection of any of the interactive graphical representations. However, in embodiments, the one or more processors 202 may receive data routed from an accelerometer of the vehicle 106, which may indicate a sudden increase in the speed or acceleration of the vehicle 106. For example, the sudden increase in speed or acceleration of the vehicle 106 may be, e.g., as a result of the vehicle 106 traveling over a speed bump, hitting a curb, etc. The one or more processors 202 may analyze the data from the accelerometer in conjunction with the image data and the position data and determine that the user contacting the right part 414 of the interactive graphical representation of the song icon 406 was an accidental contact, and that the user 110 intended to select the graphical representation of the song icon 404 instead. In embodiments, the one or more processors 202 may, based on determining the intended action of the user 110, instruct one or more speakers to output a song (e.g., an additional operation) associated with the song icon 406.

In embodiments, the one or more processors 202 may make such a determination based on analyzing the position data, image data, and accelerometer data associated specific to the user 110 and the vehicle 106, in addition to analyzing position, image, and accelerometer data associated with a variety of other vehicles external to the vehicle 106 and users other than the user 110. In embodiments, the one or more processors 202 may utilize the artificial intelligence neural network trained model described above and illustrated in FIG. 3B.

Figure 4E:
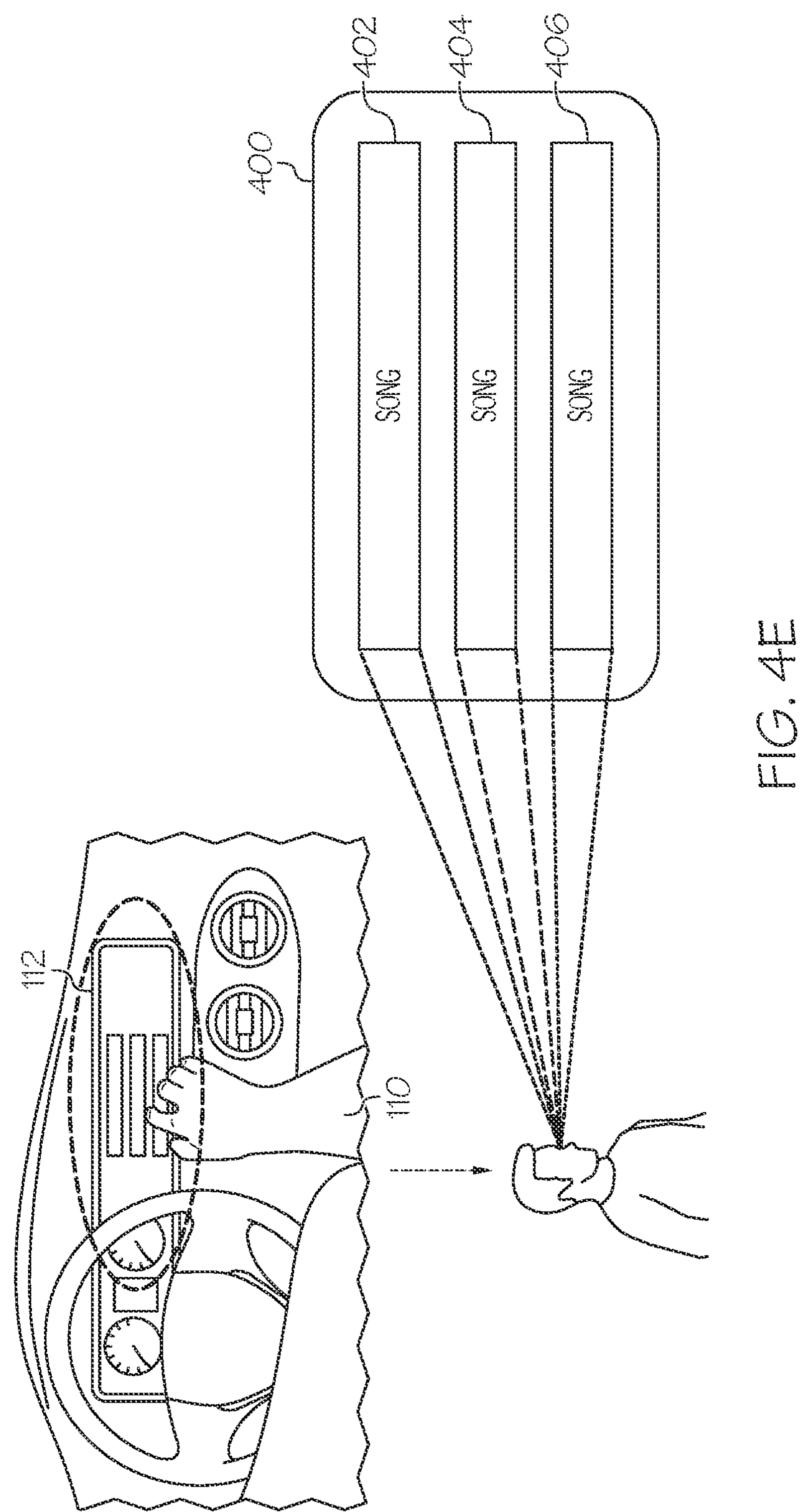
FIG. 4E depicts the user orienting his head towards the head unit and gazing at multiple interactive graphical representations corresponding to various songs icons, according to one or more embodiments described and illustrated herein.

FIG. 4E depicts the user 110 orienting his head towards the head unit 112 and gazing at multiple interactive graphical representations corresponding to the song icons 404, 404, and 406 according to one or more embodiments described and illustrated herein. For example, the inward facing camera 216 may obtain image data in real time and determine the orientation of the head of the user 110 in addition to determining the areas within the vehicle 106 at which the user may be gazing. The one or more processors 202 may analyze the image data and determine that the gaze of the user 110 is changing, within a certain predetermined time interval, from one interactive graphical representation to another. Additionally, the image data may indicate that the head of the user 110 changes orientation multiple times within a predetermined time period, which may be indicative of the user 110 switching his orientation from the head unit 112 to the street in order to continue driving.

Figure 4F:
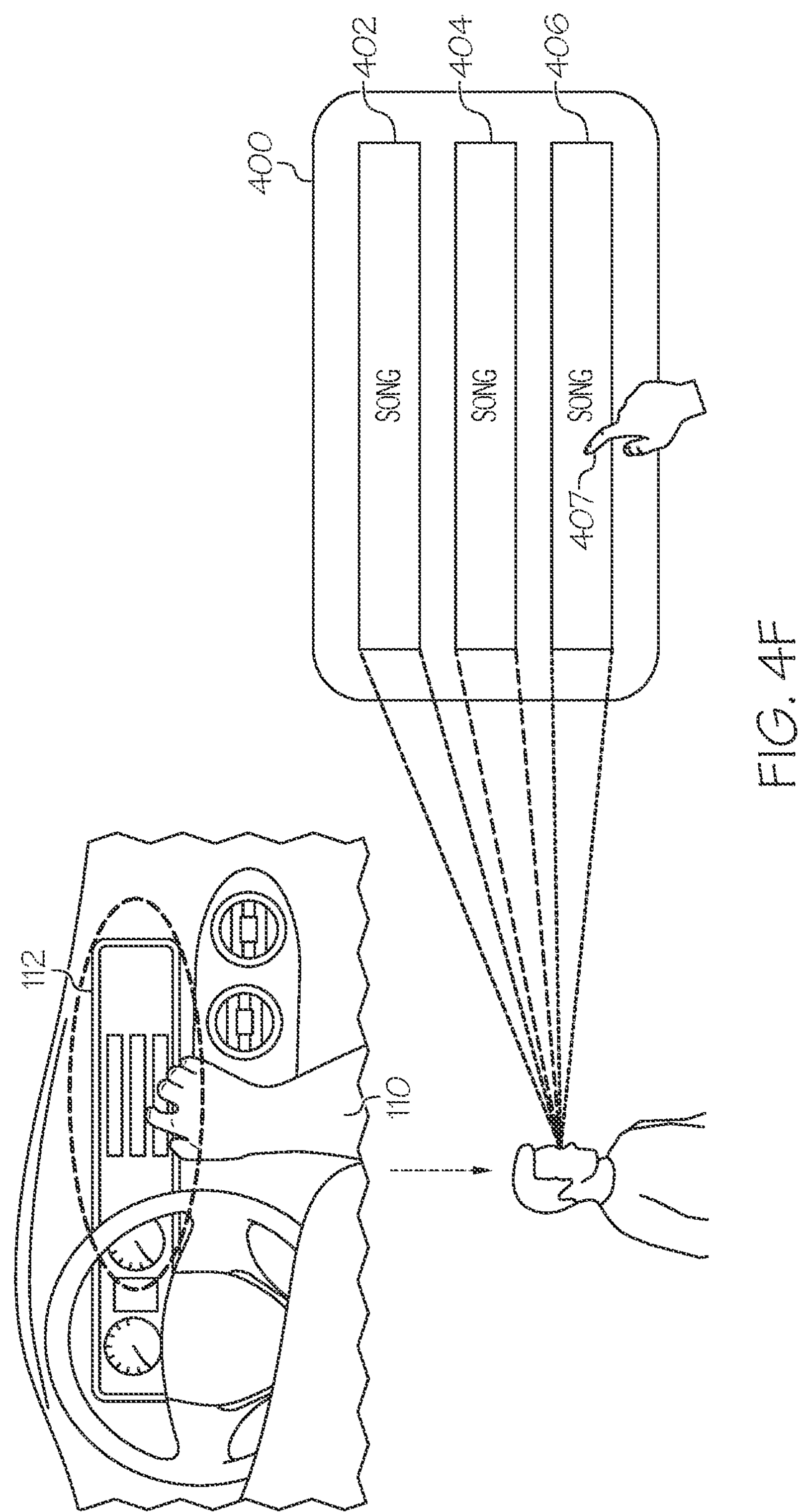
FIG. 4F depicts the user selecting the interactive graphical representation corresponding to the song icon, according to one or more embodiments described and illustrated herein.

FIG. 4F depicts the user 110 selecting the interactive graphical representation corresponding to the song icon 406, according to one or more embodiments described and illustrated herein. As shown, the user 110 may select the representation corresponding to the song icon 406 and his selection may be detected by a touch sensor installed as part of the head unit 112. The position data, which includes data of the portion of the interactive graphical representation that the user 110 contacted, may be analyzed by the one or more processors 202 to determine whether the user 110 intended to select the representation of the song icon 406. Specifically, the one or more processors 202 may analyze the image data and the position data and determine that the actions of the user 110 indicate conflicting intentions. As such, in embodiments, the one or more processors 202 may analyze, using the artificial intelligence neural network trained model, historical image data and historical position data of the user 110 and other users that performed similar conflicting actions in their respective vehicles. The analysis may indicate that in a large percentage of these cases, the contact based selection of the users indicated the intent of the users.

In the example interaction illustrated in FIGS. 4E and 4F, the one or more processors 202 may determine that the target action that the user 110 intended to perform was selecting the interactive graphical representation corresponding to the song icon 406, and as such, may instruct the audio component of the vehicle 106 to output (e.g., play) a song associated with the song icon 406, and ignore or discard the data that is indicative of the gaze of the user 110 changing, within a certain predetermined time interval, from one interactive graphical representation to another. In other words, the one or more processors 202 may analyze the image data and the position data and determine that the image data pertaining to the changing gaze of the user is unreliable and not indicative of the intent of the user 110.

Figure 5A:
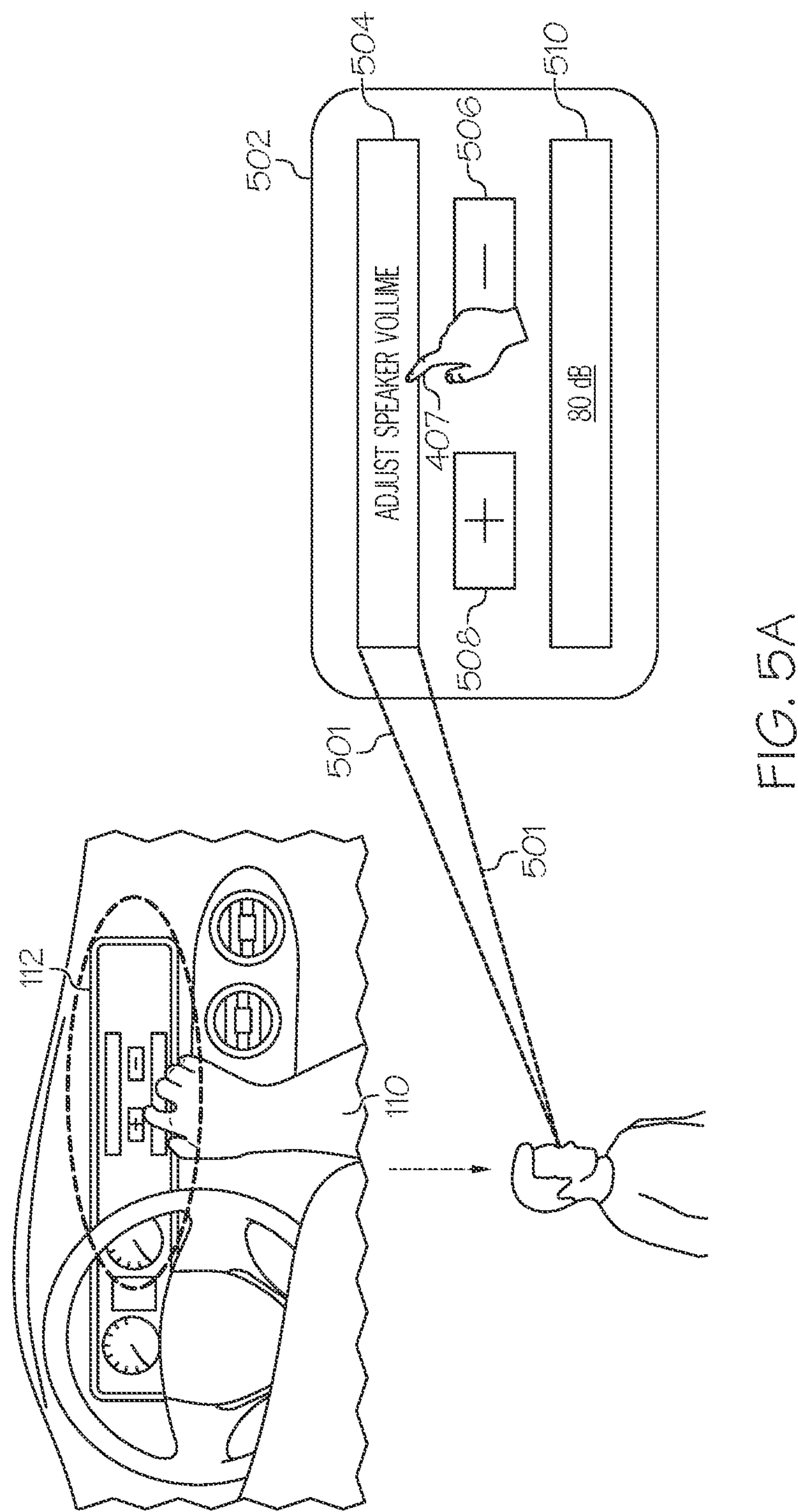
FIG. 5A depicts the user directing his gaze at and selecting an interactive graphical representation that enables adjusting a volume of an audio component, according to one or more embodiments described and illustrated herein.

FIG. 5A depicts the user 110 directing his gaze at and selecting an interactive graphical representation that enables adjusting a volume of an audio component, according to one or more embodiments described and illustrated herein. As illustrated, the user 110 is directing a gaze 501 towards an interactive graphical representation 504 that is displayed on an example user interface 502 output on the display of the head unit 112. Additionally, the user 110 may select, e.g., using his index finger 407, the interactive graphical representation 504 and set the volume of the audio component to, e.g., 80 decibels. The user 110 set the volume of the audio component by contacting the volume adjustment graphical representations 506 and 508. The adjusted volume may be displayed in a current volume graphical representation 510, as illustrated in FIG. 5A. In embodiments, the user 110 may set the volume of the audio component to 80 decibels a certain number of times over a certain time frame. For example, the user 110 may set the volume to 80 decibels within a certain time frame from when he or she starts the vehicle 106, and may do so five days of the week. As part of the volume setting process, the user 110 may modify the volume from a default volume value (e.g., 75 decibels) to the volume value of 80 decibels.

Figure 5B:
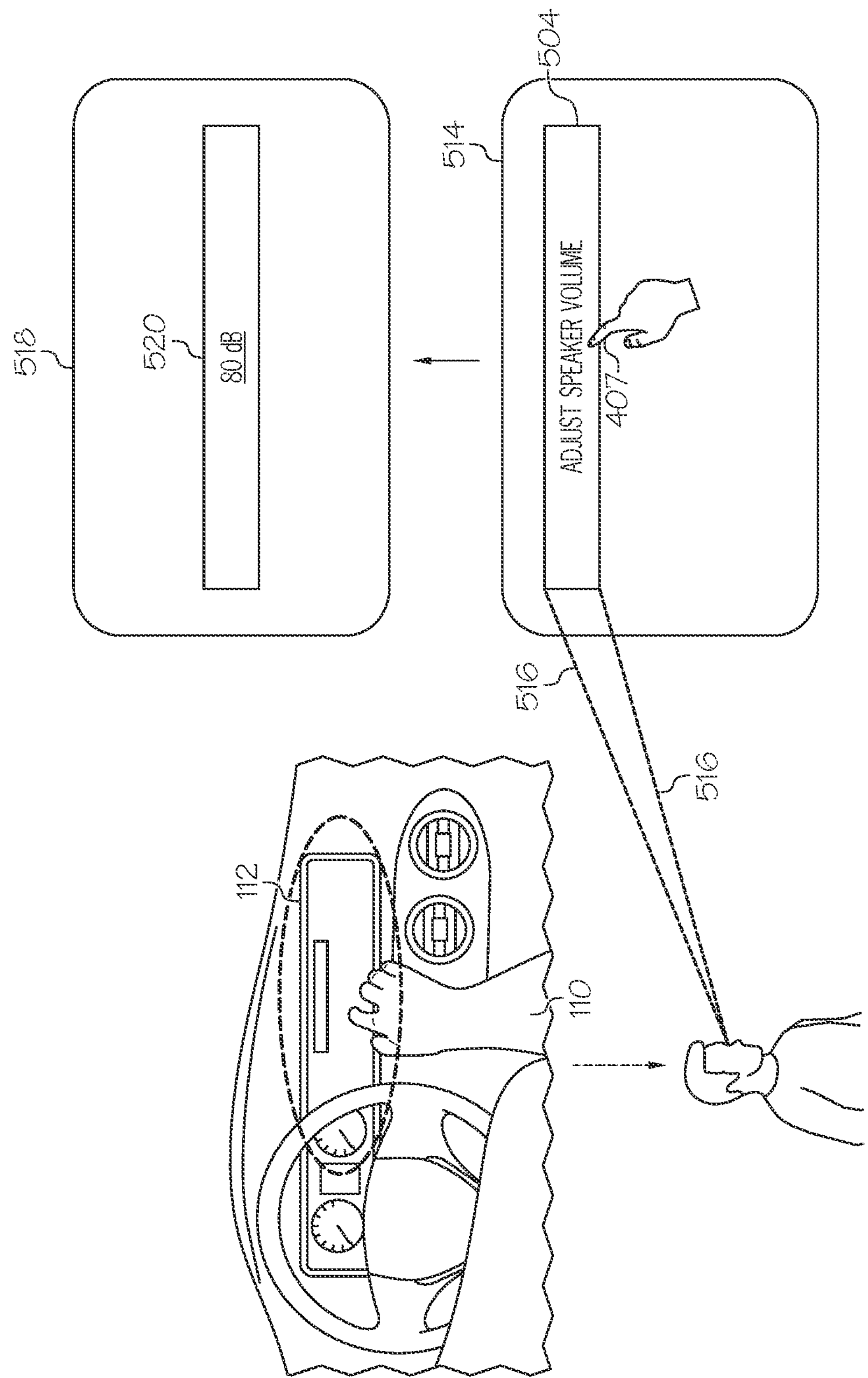
FIG. 5B depicts an automatic volume adjustment operation, according to one or more embodiments described and illustrated herein.

FIG. 5B depicts an automatic volume adjustment operation, according to one or more embodiments described and illustrated herein. In embodiments, the one or more processors 202 may analyze image data and position data associated with the user 110 and determine that the user 110 consistently sets the volume of the audio component of the vehicle 106 to 80 decibels, which may indicate that the user 110 has a volume preference. As such, in embodiments, the one or more processors 202 may, using the artificial intelligence neural network trained model and automatically and without user intervention, set the volume level to 80 decibels based on the determined preference of the user 110. The one or more processors 202, upon receiving and analyzing image data and position data specific to these actions, may automatically set the volume level to 80 decibels.

In an example operation, the image data and position data may indicate that the user 110 directed an example gaze 516 towards the interactive graphical representation 504 displayed on an example user interface 514 and contacted the interactive graphical representation 504 using his index finger 407. In response, the one or more processors 202 may, automatically and without user intervention and using the artificial intelligence neural network trained model, set the volume of the audio component to 80 decibels, as shown in the example interaction graphical representation 520 displayed on an example user interface 518.

It should be understood that the embodiments of the present disclosure are directed to a vehicle comprising a sensor, an additional sensor, a display, and a computing device that is communicatively coupled to the sensor, the additional sensor, and the display. The computing device is configured to: detect, using the sensor operating in conjunction with the computing device of the vehicle, an orientation of a part of a user relative to a location on the display that is positioned in an interior of the vehicle, detect, using the additional sensor, an interaction between the user and a portion of the display positioned in the interior of the vehicle, determine, using the computing device, whether a distance between the location and the portion of the display satisfies a threshold, and control, by the computing device, an operation associated with the vehicle responsive to determining that the distance between the location and the portion of the display satisfies the threshold.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method implemented by a computing device of a vehicle, the method comprising:

detecting, using a sensor operating in conjunction with the computing device of the vehicle, an orientation of a part of a user relative to a location on a display that is positioned in an interior of the vehicle;

detecting, using an additional sensor, an interaction between the user and a portion of the display positioned in the interior of the vehicle;

determining, using the computing device, whether a distance between the location and the portion of the display satisfies a threshold;

determining, using the computing device, whether the orientation of the part of the user relative to the location on the display occurred within a predetermined time threshold of the interaction between the user and the portion of the display;

determining, by the computing device, a change in movement of the vehicle;

determining, by the computing device, whether the change in movement occurred around when the interaction occurred;

controlling, by the computing device, a first operation associated with the vehicle responsive to determining that the distance between the location and the portion of the display satisfies the threshold and the predetermined time threshold; and in response to determining that the distance between the location and the portion of the display does not satisfy the threshold or the predetermined time threshold, and that the change in movement occurred around when the interaction occurred, determining that the interaction was accidental and controlling a second operation associated with the vehicle at the location on the display where the orientation of the part of the user was detected.

2. The method of claim 1, wherein the display is a head unit positioned in the interior of the vehicle.

3. The method of claim 1, wherein the orientation of the part of the user relative to the location on the display is associated with a direction of a head of the user relative to the location on the display.

4. The method of claim 1, wherein the orientation of the part of the user relative to the location on the display is associated with a gaze of the user relative to the location on the display.

5. The method of claim 4, further comprising:

detecting, using the sensor operating in conjunction with the computing device of the vehicle, an additional gaze of the user relative to an additional location on the display; and detecting, using the additional sensor, an additional interaction between the user and an additional portion of the display positioned in the interior of the vehicle.

6. The method of claim 5, further comprising:

analyzing, using a neural network trained model, current data associated with the additional gaze and the additional interaction relative to historical information that includes historical gaze data of the user associated with the display and historical-interaction data of the user associated with the display;

determining, by the computing device, a target action intended to be performed by the user; and automatically controlling, by the computing device, an additional operation associated with the vehicle based on the target action.

7. The method of claim 1, further comprising:

detecting, using the sensor operating in conjunction with the computing device of the vehicle, an additional orientation of the part of the user relative to an additional location on the display that is positioned in an interior of the vehicle;

detecting, using the additional sensor, an additional interaction between the user and an additional portion of the display positioned in the interior of the vehicle; and determining, using the computing device, that an additional distance between the additional location relative to which the part of the user is additionally oriented and the additional portion of the display does not exceed the threshold.

8. The method of claim 7, further:

determining, by the computing device, a target action intended to be performed by the user; and avoiding, by the computing device, the performing of the target action responsive to determining that the additional distance between the additional location relative to which the part of the user is additionally oriented and the additional portion of the display does not exceed the threshold.

9. The method of claim 7, wherein the additional orientation of the part of the user relative to the additional location on the display is associated with an additional gaze of the user relative to the additional location on the display.

10. A vehicle comprising:

a sensor;

an additional sensor;

a display;

an accelerometer; and a computing device that is communicatively coupled to the sensor, the additional sensor, and the display, the computing device is configured to:

detect, using the sensor operating in conjunction with the computing device of the vehicle, an orientation of a part of a user relative to a location on the display that is positioned in an interior of the vehicle;

detect, using the additional sensor, an interaction between the user and a portion of the display positioned in the interior of the vehicle;

determine, using the computing device, whether a distance between the location and the portion of the display satisfies a threshold;

determine, using the computing device, whether the orientation of the part of the user relative to the location on the display occurred within a predetermined time threshold of the interaction between the user and the portion of the display;

detect, by the accelerometer, a change in movement of the vehicle;

determine whether the change in movement occurred around when the interaction occurred;

control, by the computing device, a first operation associated with the vehicle responsive to determining that the distance between the location and the portion of the display satisfies the threshold and the predetermined time threshold; and in response to determining that the distance between the location and the portion of the display does not satisfy the threshold or the predetermined time threshold, and that the change in movement occurred around when the interaction occurred, determine that the interaction was accidental and control a second operation associated with the vehicle at the location on the display where the orientation of the part of the user was detected.

11. The vehicle of claim 10, wherein the display is a head unit positioned in the interior of the vehicle.

12. The vehicle of claim 10, wherein the orientation of the part of the user relative to the location on the display is associated with a direction of a head of the user relative to the location on the display.

13. The vehicle of claim 10, wherein the orientation of the part of the user relative to the location on the display is associated with a gaze of the user relative to the location on the display.

14. The vehicle of claim 13, wherein the computing device is further configured to:

detect, using the sensor operating in conjunction with the computing device of the vehicle, an additional gaze of the user relative to an additional location on the display;

detect, using the additional sensor, an additional interaction between the user and an additional portion of the display positioned in the interior of the vehicle; and analyze, using a neural network trained model, current data associated with the additional gaze and the additional interaction relative to historical information that includes historical gaze data of the user associated with the display and historical-interaction data of the user associated with the display.

15. The vehicle of claim 14, wherein the computing device is further configured to:

determine, by the computing device, a target action intended to be performed by the user; and automatically control, by the computing device, an additional operation associated with the vehicle based on the target action intended to be performed by the user.

16. A system comprising:

a camera;

a touch sensor;

a display;

an accelerometer;

one or more processors;

one or more memory components communicatively coupled to the one or more processors; and machine readable instructions stored in the one or more memory components that cause the system to perform at least the following when executed by the one or more processors:

detect, using the camera, a gaze of a user relative to a location on the display positioned in an interior of a vehicle;

detect, using the touch sensor, an interaction between the user and a portion of the display positioned in the interior of the vehicle;

determine whether a distance between the location of the gaze and the portion of the display satisfies a threshold;

determining, using the one or more processors, whether the gaze relative to the location on the display occurred within a predetermined time threshold of the interaction between the user and the portion of the display;

detect, by the accelerometer, a change in movement of the vehicle;

determine whether the change in movement occurred around when the interaction occurred;

control a first operation associated with the vehicle responsive to determining that the distance between the location of the gaze and the portion of the display satisfies the threshold and the predetermined time threshold; and in response to determining that the distance between the location of the gaze and the portion of the display does not satisfy the threshold or the predetermined time threshold, and that the change in movement occurred around when the interaction occurred, determine that the interaction was accidental and control a second operation associated with the vehicle at the location on the display where the gaze was detected.

17. The system of claim 16, wherein the machine readable instructions stored in the one or more memory components cause the system to further perform at least the following when executed by the one or more processors:

detect, using the camera, an additional gaze of the user relative to an additional location on the display; and detect, using the touch sensor, an additional interaction between the user and an additional portion of the display positioned in the interior of the vehicle.

18. The system of claim 17, wherein the machine readable instructions stored in the one or more memory components cause the system to further perform at least the following when executed by the one or more processors:

analyze, using a neural network trained model, current data associated with the additional gaze and the additional interaction relative to historical information that includes historical gaze data of the user associated with the display and historical-interaction data of the user associated with the display;

determine a target action intended to be performed by the user; and automatically control an additional operation associated with the vehicle based on the target action.

19. The system of claim 16, wherein the machine readable instructions stored in the one or more memory components cause the system to further perform at least the following when executed by the one or more processors:

detect, using the camera, an additional gaze of the user relative to an additional location on the display that is positioned in an interior of the vehicle;

detect, using the touch sensor, an additional interaction between the user and an additional portion of the display positioned in the interior of the vehicle;

determine that an additional distance between the additional location and the additional portion does not exceed the threshold;

determine a target action intended to be performed by the user; and avoiding performing of the target action responsive to determining that that the additional distance between the additional location and the additional portion does not exceed the threshold.

* * * * *

UNITED STATES PATENT AND TRADEMARK OFFICE

CERTIFICATE OF CORRECTION

PATENT NO. : 11,768,536 B2
APPLICATION NO. : 17/470532
DATED : September 26, 2023
INVENTOR(S) : Mikio David It is certified that error appears in the above-identified patent and that said Letters Patent is hereby corrected as shown below:

On the Title Page

In page 2, Column 1, item (56), U.S. patent documents, cite no. 3, delete “Kusch” and insert --KUSCHER; Alexander Friedrich--, therefor.

In the Specification

In Column 3, Line(s) 28, after “selects”, delete “a icon” and insert --an icon--, therefor.

In Column 3, Line(s) 32, after “correct”, delete “for”.

In Column 10, Line(s) 65, after “between”, delete “with”.

Signed and Sealed this
Second Day of April, 2024

Katherine Kelly Vidal

Katherine Kelly Vidal
*Director of the United States Patent and Trademark Office*